United States Patent [19]

Plevyak

[11] 3,924,430

[45] Dec. 9, 1975

[54] SWING ROLL TOOL ASSEMBLY

[76] Inventor: Joseph B. Plevyak, 19 Jefferson St., Newton, N.J. 07860

[22] Filed: Oct. 21, 1974

[21] Appl. No.: 516,268

[52] U.S. Cl. .................................. 72/85; 72/703
[51] Int. Cl.² ...................... B23P 9/02; B21H 7/14
[58] Field of Search ................ 72/703, 85, 112, 114

[56] References Cited
UNITED STATES PATENTS

| | | | |
|---|---|---|---|
| 1,883,080 | 10/1932 | Stull et al. | 72/703 |
| 3,349,656 | 10/1967 | Plevyak | 72/703 |
| 3,538,731 | 11/1970 | Plevyak | 72/703 |

FOREIGN PATENTS OR APPLICATIONS

| | | | |
|---|---|---|---|
| 800,267 | 7/1936 | France | 72/703 |

*Primary Examiner*—C. W. Lanham
*Assistant Examiner*—D. M. Gurley

[57] ABSTRACT

A swing roll assembly adapted for use on lathe machine turrets. This roll tool assembly includes a main body with swing arms opposingly pivoted on the body and having roll tool or knurling elements carried on the outer ends of the arms and when swung toward the work piece will engage the opposite sides of the workpiece on dead center diameter thereof. The means for operating the assembly is self contained and adapted to be acted upon by a mere sliding movement of a cross slide of a lathe tool the operating means include a rack gear, gears engaging with the rack, these gears including an idler gear to the opposite sides of which the pinion gears of the respective roll tool swing arms mesh. To provide other adjustment and operation of the gears and at the same time provide as a stop device for limiting the inward movement of the swing arms upon the work, a further manually operated slide is provided upon the tool body in the form of a rack for engagement with the idler gear which has adjusting screws for limiting the swing of the arms, the depth of cut of the tool roll into the work and also providing manual means by which the gears and the swing arms can be operated manually. The main operating rack gear also has adjusting screws for limiting the movement of the first rack gear which is adapted to be power operated. The depth of cut of the roll tool can be established by one setting of the rack gear.

4 Claims, 9 Drawing Figures

INVENTOR.
JOSEPH B. PLEVYAK
BY Polachek & Saulsbury
ATTORNEYS

INVENTOR.
JOSEPH B. PLEVYAK
BY
Polachek & Saulsbury
ATTORNEYS

3,924,430

SWING ROLL TOOL ASSEMBLY

This invention relates to swing arm roll tool assembly for use with turret lathes.

One object of the invention is to provide a swing arm roll tool assembly in which the swing arms will diagonally oppose one another and apply dead center pressure on a workpiece from the opposite sides thereof from zero to machine capacity to thereby eliminate transverse strains, climbing, springing of the workpiece or the tool when effecting work operation upon the workpiece.

It is another object of the invention to provide a swing arm roll tool assembly which is adapted to be mounted on a turret head in a radial opening thereof and which can be struck or actuated by a cross slide of the turret machine, the swing arm assembly having a push bar or rack gear projecting from the main body of the assembly and adapted to be adjustably aligned to be struck by a moving part of the lathe and at the same time will have means by which the tool assembly including its gears and swing arms can be operated by hand.

It is still another object of the invention to provide a knurling tool or thread roll assembly in which the tool elements are provided on the ends of swingable arms and which has adequate adjusting means to effect upon the workpiece a sharp, precise, clean and fine knurling or threading upon the workpiece on even small diameters.

It is a further object of the invention to provide a roll tool assembly employing swing arms, the movements of which can be adjusted by a single setting of adjusting screws and in which the usual tedious adjustment of supporting blocks of tools for performing this type of work and have a tool in which springing of the tool, climbing, galling and marking of the workpieces will not be possible.

Other objects of the invention are to provide a roll tool assembly employing opposing swing arms with roll tools journaled thereon, having the above objects in mind, which is of simple construction, has a minimum number of parts, easy to assembly upon the turret lathe, easy to adapt for operation with the lathe cross slide, adapted to be locked against turning movement upon the turret lathe head, has removeable roll tool elements which can be replaced by other tool elements readily by detachment from the outer ends of the swing arms, automatic in operation, efficient and effective in use.

For other objects and for a better understanding of the invention, reference may be had to the following detailed description taken in connection with the accompanying drawings, in which.

Figure 1:
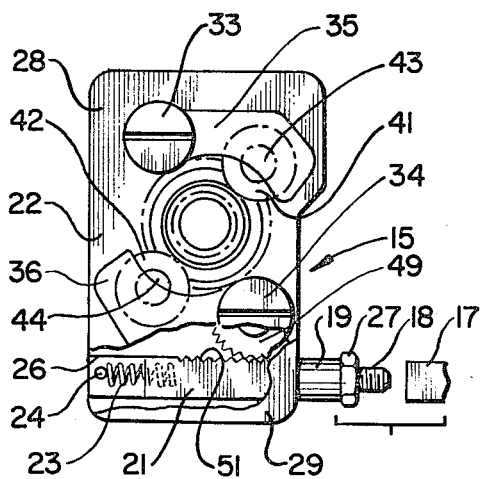
FIG. 1 is a front elevational view of a turret lathe adjustable knurling tool assembly with portions broken away to show the rack and pinion mechanism for effecting the engagement of the knurling elements on the opposite sides of the workpiece and a fragment of the moveable part of the lathe for abutting the rack.
Figure 2:
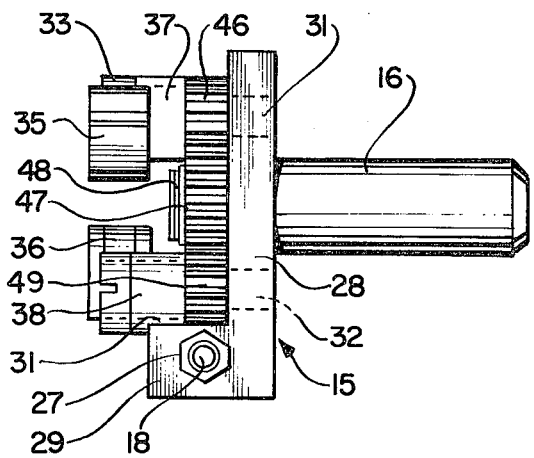
FIG. 2 is a side elevational view of the adjustable knurling tool assembly with the turret attaching shank being extended from the rear face thereof.
Figures 3, 4:
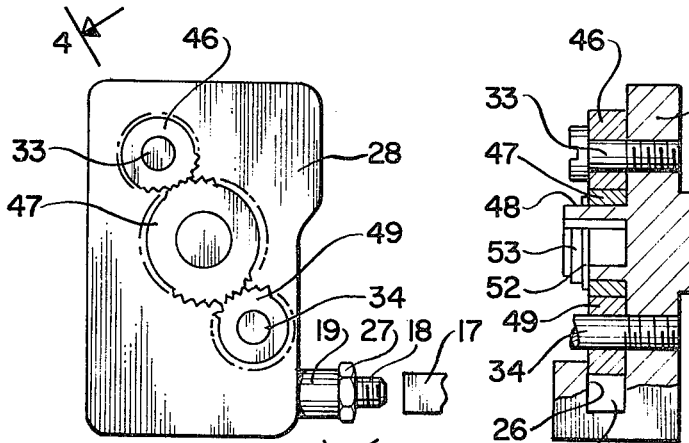
FIG. 3 is a front elevational view of the knurling tool assembly, similar to FIG. 1, but with the knurling elements and swing arms therefor being removed from the front of the assembly.
FIG. 4 is a fragmentary sectional view taken on line 4—4 and looking in the direction of the arrows thereof.

Referring now particularly to FIGS. 1 to 4 there is shown generally an adjustable knurl tool assembly 15 adapted to be connected by a laterally extending shank 16 to a turret head of a lathe and to be struck laterally by a cross slide of the same lathe moved by an ordinary crank or wheel and with a fragment of the same being indicated at 17 which is adapted to strike a threaded extension 18 adjustable in a rack gear head 19 of a rack gear 21 that is laterally slidable within an opening in a casing 22 and against the action of a return coil spring 23 held in place by a pin 24 extending across opening 26 in which the rack gear 21 is guided and slides. A locking nut 27 will secure the threaded bolt extension 18 in its adjusted position within the rack gear head 19. This assembly 15 further includes a heavy rectangular-shaped plate like body 28 that has a forwardly extending portion 29 forming a shelf 31 in which the rack gear opening 26 with the rack gear 21 is mounted. This heavy plate like body 28 has two threaded openings 31 and 32 which are diagonally opposite from one another and into which there is threaded mounting pins 33 and 34 which are headed to be engaged by a screwdriver shank and on which there is pivotally mounted respectively knurl roller swing arms 35 and 36 having respectively hubs 37 and 38 of sufficient length to provide upon the pins 33 and 34 respectively good steadying bearing surfaces to permit the swing arms to be pivoted and adjusted for rigid engagement with the work in order that knurling tool elements carried respectively by these arms 35 and 36 will be effective upon the workpiece. These knurling tool elements are in the form of knurling rollers having roughened and hardened work surfaces and respectively rotate upon pins 43 and 44 and are journaled to these pins inside the side walls of the arms 35 and 36 respectively.

Upon the upper pin 33 there is journaled while laying flat against the front face of the heavy plate like body 28, a pinion gear 46 either integrally united with the hub of the swing arm 35 or secured rigidly thereto and this gear 46 is in mesh with a central idler gear 47 which is journaled upon a forwardly extending sleeve portion 48 extending forwardly from the front face of the plate like body 28 and centrally thereof and in axial alignment with the shank 16.

Diametrically opposite from the gear 46 and integral or rigidly connected to the swing arm 36 is a pinion gear 49 that with the swing arm 36 is pivoted on the stud pin or screw 34. This gear 49 meshes with rack teeth 51 on the rack gear 21.

The idler gear 47 is held in place upon the sleeve projection 48 by a washer 52 and a spring ring 53.

By engagement of the cross slide 17 with the threaded pin 18 the gear is thrust inwardly against the action of the spring 23 so as to rotate the pinion gear 49 as best seen in FIG. 1 and to thereby cause a transfer of this motion through idler gear 47 to the pinion gear 46. Since these pinion gears 46 and 49 are made integral with their respective swing arms 35 and 36, the swing arms 35 and 36 will be swung toward one another so as to have diametrically opposite engagement with a workpiece of the knurling rollers 41 and 42 to effect a knurling operation upon any workpiece extending from a lathe chuck and rotated thereby. As long as the cross slide 17 is held in place and the knurling rollers 41 and 42 remain in contact with the workpiecee the surface of the workpiece will be knurled. These swing arms 35 and 36 thus will work in unison and upon the cross slide 17 being retracted the return spring 23 will be effected to operate the rack gear and effect reverse rotation of the gears 46, 47 and 49 to return the swing arms 35 and 36 with the knurling rollers 41 and 42 to their retracted positions and out of engagement with the workpiece.

It should be apparent that the knurling rollers 41 and 42 are positioned in the recesses of the swing arms 35 and 36 and extend outward thereof in order to contact the workpiece. These rollers are in exact angular opposed relation and forwardly and outwardly of the rotating plain of the idler gear 47 and the pinions 46 and 49.

The coil spring 23 between the end of the rack gear 21 and the transverse stop pin 24 urges the rack gear 21 outwardly and the knurl rollers away from the workpiece and out of use. When the knurl rollers 41 and 42 are moved toward the workpiece from opposite directions the swing arms 35 and 36 produce a dead center pressure on the workpiece diameter. One swing arm and knurl roller is moved clockwise and the other swing arm and its knurl roller is moved counter clockwise. Objectionable stresses are completely eliminated producing uniform, accurate and favorable finishes upon the workpiece. The swing arms are moved evenly and simultaneously from opposite sides of the workpiece in an arcuate path to have tangential point contact with the workpiece upon the dead center diameter and will apply even and equal pressure thereupon from zero to tool capacity. Objectional stresses are eliminated. Uniform accurate and good finishes will be had.

Referring now to FIGS. 5 to 9, there is shown a modified form of the invention in which the rack acts upon upon a separate pinion connected to the idler gear and the idler gear works the swing arm pinions to bring the knurling rollers into engagement simultaneously and with equal pressure upon opposite sides of the workpiece and in dead center of the work diameter and through the axial center of the workpiece. Further, in this form of the invention it will be noted that means are provided for effecting adjustment for the movement of the rack and also an adjusting screw by which the knurling roller arms can be opened and closed upon the workpiece without the use of the pusher bar rack.

Figure 6:
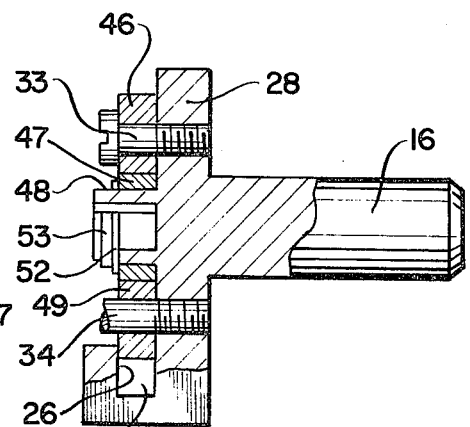
FIG. 6 is a front elevational view of the knurling tool assembly shown in FIG. 5.
Figure 5:
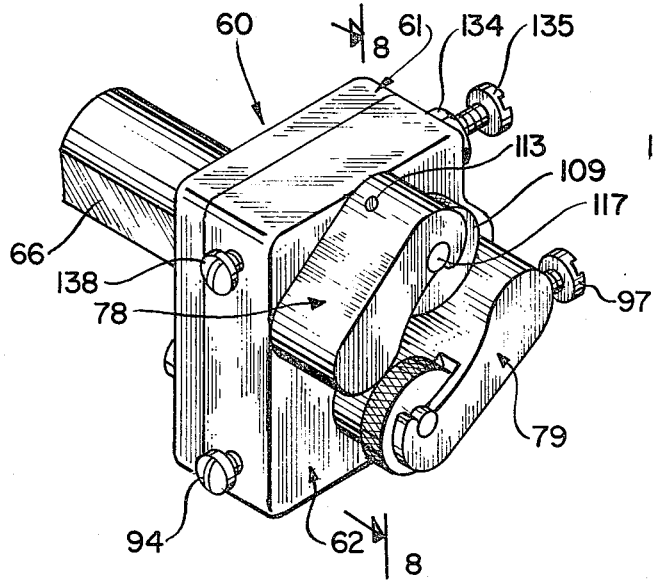
FIG. 5 is a front perspective view of a turret lathe adjustable knurling tool assembly constructed according to a modified form of the invention with an adjustable stop rack operable upon the idler and intermediate gear to limit the movement of the knurling element swing arms.

This turret lathe knurling tool assembly according to the modified form is indicated generally at 60, FIGS. 5 and 6, which to further distinguish this form from the first form of the invention into two part construction with the gearing enclosed. The two parts are indicated generally at 61 and 62, the part 61 having the mounting stud 63 for connecting the knurling tool assembly to the lathe turret and the part 62 serving to enclose the gearing and as the mounting plate for the swing arms with the knurling tools all of which assembled in a manner to be described more in detail, after first making description to this mounting stud part 63.

Figure 7:
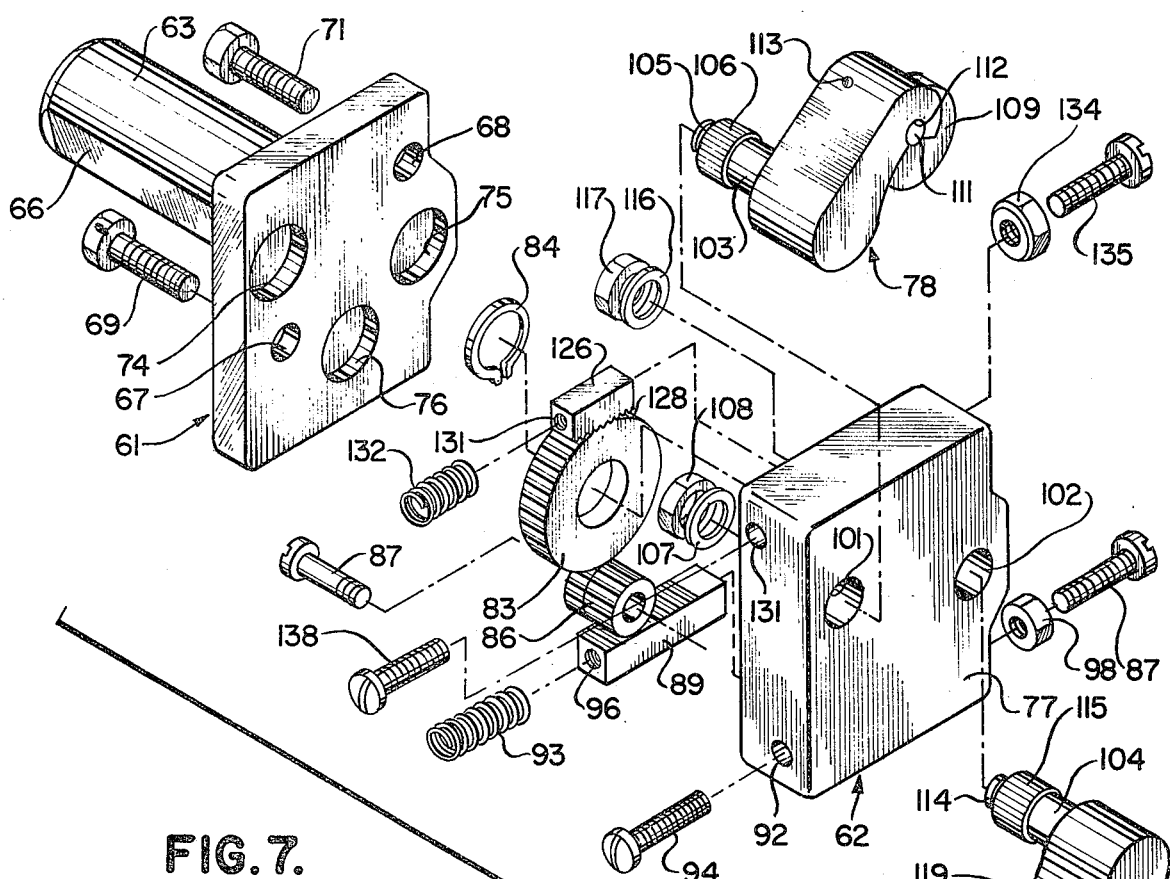
FIG. 7 is an exploded and perspective view of the various parts of the knurling tool assembly shown in FIG. 5.

This part 61 comprises a closure plate body portion 64 having the overall dimensions of the tool assembly and the mounting stud for connecting the assembly 60 to a turret lathe. This mounting stud 63 is integrally formed with the plate like body portion 64 and projects rearwardly therefrom and is of such diameter as to fit tightly within a turret opening. This stud 63 has a flat face 66 which cooperates with the clamping parts of the turret head to keep the assembly 60 from rotating in the mounting opening of the turret head and so that the knurling tool assembly 60 becomes in effect an integral part of the turret head and of the lathe. The plate like body portion 64 is generally square in shape and has two diametrically opposed openings 67 and 68 through which the respective threaded bolts 69 and 71 are extended to threadingly engage respective holes 72 and 73, FIG. 8 in the gear housing part 62 to thereby secure the two parts 61 and 62 together. Further as shown in FIG. 7, the inner face of the plate like body portion 64 of the part 61 has three circular recesses 74, 75 and 76 to allow space for various parts assembled in the housing part 62 when closing the part 61 upon the part 62.

Part 62 is generally in the form of an open ended housing for gears and the part 61 is a cover for the open end of the part 62. This part 62 is generally of square shape conforming in shape to the part 61 and has a flat front face 77 over which knurling roll swing arms 78 and 79 can swing while effecting a knurling operation upon the end of a workpiece.

Extending inwardly from the front face wall 77 of the part 62 is a cylindrical projection 81, the longitudinal axis of which being coextensive with the axis of the mounting stud 63 of the part 61. This projection 81 has on its end removed from the front wall 77 a reduced diameter portion 82 on which a large central idler gear 83 is journaled and retained thereupon by a lock washer 84.

Lying in mesh with the idler gear 83 is a drive pinion 86 which is journaled upon a stud bolt 87 threaded into the front portion 77. Any rotation of the pinion 86 will effect rotation of the idler gear 83.

Extending through the bottom of the casing part 62 is a square opening 88 in which a rack gear 89 is adapted to slide while its teeth 91 are in engagement with the pinion 86 so that by sliding movement of the rack gear 89 in and out of the opening 88 will effect rotation of the pinion gear 86 and the idler gear 83. While one end of the opening 88 is open to the full dimension of the rack gear 89, that is of square section, the other end of the opening has a hole 92 providing for a shoulder against which a return coil spring 93 reacts to normally urge the outward movement of the rack gear 89.

Figure 8:
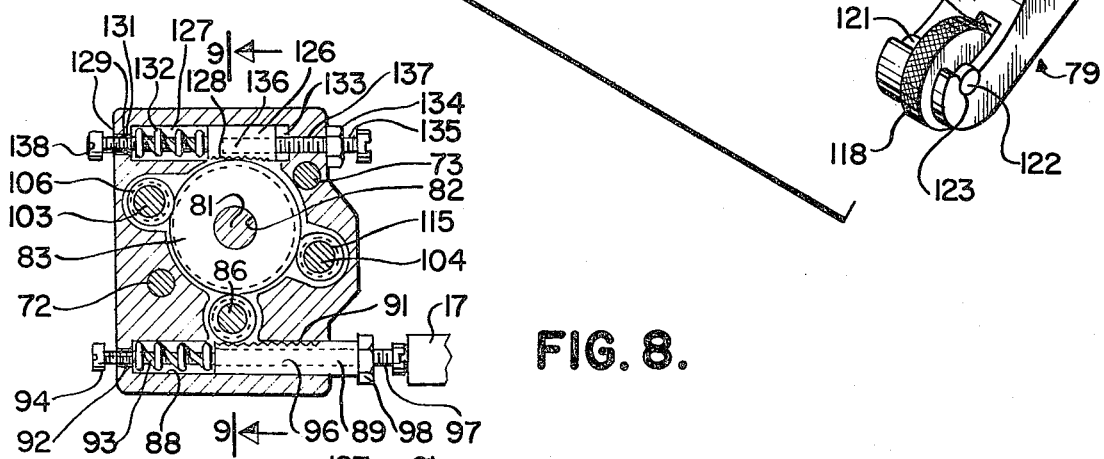
FIG. 8 is a vertical sectional view looking in transverse plan upon the rack pinions and the operating gears and as viewed generally on line 8—8 of FIG. 5.
Figure 9:
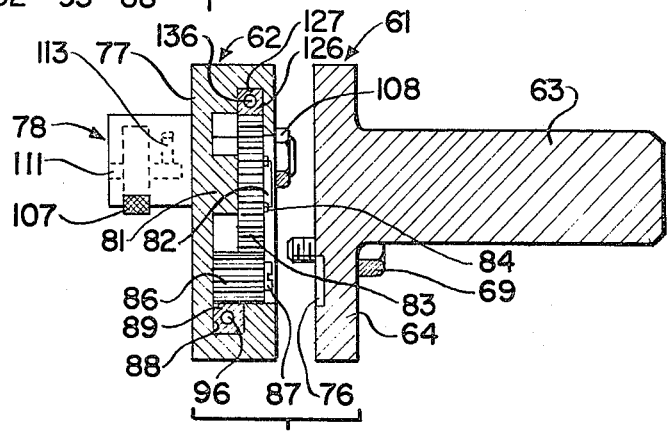
FIG. 9 is a collective vertical sectional view of the turret tool assembly with the shank for attaching the tool assembly to the turret lathe separated from the gear containing part, and as viewed generally on line 9—9 of FIG. 8.

In order to limit the outward movement of the rack gear 89 from the opening 88 and consequently limit the outward swing of the knurling roll arms, as will be understood with further description, a threaded adjusting bolt or screw 94 extends through the end opening 92 and is threadedly engaged with a hole 96 that extends through the full length of the rack gear 89. This bolt 94 is headed and its head will engage against the outer edge of the part 62 to thereby stop the outward movement of this rack gear 89 against the action of the spring 93. By adjusting this bolt 94 the outward extent to which the swing arms 78 and 79 return to their retracted positions may be altered. On the opposite end of the rack gear 89 there is secured an adjustable screw bolt 97 that is threaded in the threaded opening 96 of the rack gear 89 and a lock nut 98 to lock the adjustable screw bolt 97 in its adjusted position. By adjusting the screw bolt 97 the slide itself is in effect elongated or shortened and the external operating part 17 which may be a portion of the transverse slide of a lathe as above mentioned, and make the proper engagement therewith so that the full stroke of the transverse slide part 17 can be effected. In other words by adjusting the screw 97 the knurling tool assembly is adapted and adjusted to the transverse slide of a lathe forming a part of a turret type of lathe. It should be understood that other moveable parts of the lathe can be used to activate the knurling tool assembly. Swing Arms 78 and 79 are self contained and adapted to be mounted flush upon the front face wall 77 of the part 62 for pivotal movement in the respective mounting openings 101 and 102 by means of their respective mounting pin projections 103 and 104. The pivot pin projection 103 of the swing arm 78 has a threaded end portion 105 on to which there is secured a pinion size gear 106 that when the pin projection 103 extends for pivot connection in the opening 101 and upon engagement of a washer 107 and a nut 108 upon the threaded end 105, the swing arm 78 is held in place against displacement from the front wall portion 77 of the part 62 and at the same time permitted to turn angularly through a small work angle for engagement of its knurling roller 109 with a centrally disposed workpiece extended toward or against the front face 77 of the part 62. This pinion like gear 106 as best seen in FIG. 8 meshes with the idler gear 83. The nut 108 will lie in the recess 74 on the inner face of the plate like body portion 64 of the part 61.

The outer end of the swing arm 78 is recessed on its underside to provide a slot in which the knurling roller 109 is fitted when its opposing trunnion formations on the opposite side of the roller 109 are journaled in opposite bearing slots at the opposite sides of the recess. These trunnion recesses 112 are partially open, but not through the full diameter of the slot 112, but such that upon pressure being applied to the knurling roller to remove the trunnion formation 111 outwardly from the slots 112, the trunnion formation can pass through so as to allow for replacement of the knurling roller 109 or with a knurling roller 109 of a different variety. In order to assist in moving the trunnion formations 111 of the knurling roller 109 out of the slot 112, a small screw 113 can be extended into one of the trunnion openings 112 to place pressure on the trunnion formation therein to force the same out to the open part of the trunnion opening 112.

The swing arm 79 that opposes the swing arm 78 is of similar construction and is similarly secured with its pivot projection 104 in the pivot opening 102. This pivot projection 104 has a threaded portion 114 on to which a pinion like gear 115 is secured by a washer 116 and a nut 117 and in such a manner that the swing arm can pivot or turn upon the front face 77 of the part 62. The pinion like gear 115 meshes with the idler gear at the exact diametrically opposite location thereon from the pinion gear 106 of the swing arm 78 and being on the opposite side of the idler gear will be driven in the opposite direction to cause the swing arms 78 and 79 to be turned in opposite directions and to bring their respective knurling rollers 109 and 118 in engagement or in exact dead center of the work diameter of the workpiece.

It will be noted as best seen in FIG. 7 that the swing arm 79 also has a recess as indicated at 119 on its underside in which the knurling roller 118 can rotate, its opposite trunnions 121 and 122 lying in open trunnion receiving recesses 123 and in which the trunnions and the knurling roller 118 can easily rotate and by the applying of pressure on one of the trunnions, the roller with its trunnions can be lifted from the open trunnion openings 123. Thus it should now be apparent that as the rack gear 89 is moved inwardly by the lathe transverse slide 17 or any other moving part that the pinion like gear 86 is rotated in a clockwise direction as viewed in FIG. 8, and that the idler gear 83 to which motion is transferred from the pinion like gear 86 will be turned in a counter clockwise direction. The pinion like gears 106 and 115 that are in mesh with the idler gear 83 at diametrically opposite sides thereof will be respectively turned in either clockwise or counter clockwise directions so as to cause the swing arms 78 and 79 to be brought toward one another and their respective knurling rollers 109 and 118 into engagement with a workpiece upon the exact opposite and dead center diameter engagement therewith to effect thereby a knurling operation upon the surface of the workpiece.

In order to limit the inward engagement of the knurling rollers 109 and 118 of the swing arms with the workpiece, and in order to adapt the assembly to different types of knurling formations and depth of knurling upon the surface of the workpiece there is provided an adjustable screw device or rack gear, indicated generally at 126 in a top transverse opening 127 in the part 62. Opening 127 is a square section to receive the square section rack gear 126 which has rack teeth 128 thereon that meshes with the idler gear 83. One end of the opening 127 is closed by a holed plug 129, tightly fitted, and having a hole 131 for lubricating purposes, and providing a shoulder against which a coil compression spring 132 may react to urge the rack gear 126 toward the opposite end of the opening and against a shoulder 133 thereat. Since the rack gear 126 is in engagement with the idler gear 83 that rotates in an anti clockwise direction, the rack gear 126 is urged to the left as viewed in FIG. 8, against the action of the spring 132. The amount of movement of the rack gear 126 to the left will depend upon the setting of a lock nut 134 threaded upon an adjusting screw 135 that is adjustable into and out of a threaded opening 136 in the rack gear 126. The bolt 135 is slidable through a free hole 137 and upon movement of the rack gear 126 to the left the threaded bolt 135 will slide through the free opening 137 and the slide will come to a stop upon the stop or lock nut 134 on the adjusting screw 135 engaging with the end face of the part 62. By adjusting the nut 134 the depth of penetration of the knurling projection of the knurling rollers will be adjusted in accordance with the particular knurling rollers being used to the knurling effect upon the workpiece that is desired.

If movement of the rack gear 89 is not in position to be effected by the portion 17 of a transverse guide of the lathe, an adjusting screw that is threaded in the threaded opening 136 of the rack gear 126 can be tightened to bring the rack gear 126 to a locked position to the left with the stop nut 134 being adjusted to have the same extended to the left to a sufficient distance. This time the swing arms with the knurling rollers will have been brought into engagement with the workpiece for effecting the knurling operation. Thus without power means upon the lathe the knurling tool assembly can be manually set for effecting the knurling operation.

It should now be apparent that the straight line movement of a gear rack will through pinion like gears on opposite sides of a center idler gear will effect pivotal movement of knurling roller bearing swinging arms against a workpiece to produce dead on the center line pressure with the opposite sides of the workpiece and the opposing tool pressure will always be in dead center with the work diameter, whereby to improve knurling and marking operations and also provide a tool for use with threading rolls and such that accurate threading, rolling operations can be effected. It is not necessary to remove the swing arms from the tool body to change the knurling or thread rolls.

This knurling tool assembly is so constructed as to produce self alignment of the knurling tools and with dead center pressure on the work diameter from zero engagement with the work to tool capacity of the knurling tools. While the knurling rollers are moved into engagement with the work through an arcuate path, they have single point contact of their periphery with the work surfaces and with a dead center line diameter of the workpiece. It should further be apparent that backlash of the gears can lessened by the various adjusting bolts provided upon the rack gear or gears and by engagement of the stop nuts and adjusting screws with the assembly body.

What is claimed is:

1. A roll tool assembly adapted for use with a lathe turret having a radially extending mounting opening, comprising a main body portion and a mounting stud radiating from one side of the main body and adapted to be extended into the mounting opening in the lathe turret, said main body having diagonally opposed holes on its front face, swing arms respectively carrying tooling rolls, said swing arms having inwardly extending projections respectively pivotally mounted in the respective diagonally opposed holes, an idler gear mounted upon the main body and said pivot projections respectively having pinion gears meshing with the idler gear, and gear means carried upon the main body and operable upon the idler gear to rotate said idler and pinion gears for swinging the arms and the tool rolls simultaneously into engagement with the opposite sides of a workpiece, said tool rolls coming into engagement with the surfaces of the workpiece on dead center diameter so that equal and opposing pressure will be effected between the tool rolls, a rack gear means for rotating said pinion gears and swinging said tool arms, said rack gear means being spring pressed and slidably carried on said main body, said gear means journaled upon said body and meshable with the idler gear and with the rack gear means, said rack gear means being adapted to be actuated by engagement with a movable part of the lathe; a second rack gear means slidably carried by the main body and having rack teeth meshing with the idler gear, a compression spring urging the second rack gear means in a direction to an outermost position toward the movable lathe part, said spring being further compressed upon the first rack gear means being operated by said movable lathe part and an adjusting screw means threaded into one end of the second rack bar and engageable with the main body to limit the movement of the first rack bar and the inward swinging of the roll swing arms.

2. A roll tool assembly adapted for use with a lathe turret having a radially extending mounting opening, as defined in claim 1, and an adjusting screw threadedly engaging the opposite end of the second rack gear means and adapted to be adjusted to move the second rack gear means into a locked position with the body to effect operation of the swing arms against the workpiece.

3. A roll tool assembly adapted for use with a lathe turret having a radially-extending mounting opening, comprising a main body and a mounting stud radiating from one side of the main body and adapted to be extended into the mounting opening in the lathe turret, said main body having diagonally opposed holes on its front face, swing arms respectively carrying tool rolls, said swing arms having inwardly extending projections respectively pivotally mounted in the respective diagonally opposed holes, an idler gear said pivot projections respectively having pinion gears meshing with the idler gear,gear means journaled upon said body and meshing with the idler gear and a rack gear means, said rack gear means slidably carried upon the main body and operable upon said gear means when operated, to rotate said idler gear and pinion gears for swinging the arms and the tool rolls simultaneously into engagement with the opposite sides of a workpiece, said tool rolls coming into engagement with the surface of the workpiece on dead center diameter so that equal and opposing pressure will be effected between the tool rolls, and a second rack gear means having teeth engageable with the idler gear, an adjusting bolt threadedly engaging the second rack gear means and extending outwardly of the body and a lock nut on the adjusting bolt as the second rack gear means is worked by the idler gear to adjustably limit the movement of the second rack gear means by the idler gear and the engagement of the roll tool elements with the workpiece.

4. A roll tool assembly as defined in claim 3, and compression spring means urging the second rack gear means to a return position and an adjusting screw extending through the compression spring and into the second rack gear means and upon its head engaging with the main body the second rack gear means may be worked to independently effect the bringing together of the swing arms and the rolling elements in locked position upon the workpiece.

* * * * *